(12) United States Patent
Cernasov

(10) Patent No.: US 7,675,672 B2
(45) Date of Patent: Mar. 9, 2010

(54) NON-VOLATILE ADDRESSABLE ELECTRONIC PAPER FOR DISPOSABLE FLEXIBLE DISPLAYS

(75) Inventor: Andrel Cernasov, Ringwood, NJ (US)

(73) Assignee: Honeywell International Inc., Morristown, NJ (US)

( * ) Notice: Subject to any disclaimer, the term of this patent is extended or adjusted under 35 U.S.C. 154(b) by 689 days.

(21) Appl. No.: 11/558,141

(22) Filed: Nov. 9, 2006

(65) Prior Publication Data
US 2008/0111785 A1 May 15, 2008

(51) Int. Cl.
*G02B 26/00* (2006.01)
(52) U.S. Cl. ........................ 359/296; 359/290
(58) Field of Classification Search ................ 359/296, 359/290, 238, 223, 224; 345/107
See application file for complete search history.

(56) References Cited

U.S. PATENT DOCUMENTS

| | | | |
|---|---|---|---|
| 5,293,528 A | 3/1994 | DiSanto et al. |
| 5,745,094 A | 4/1998 | Gordon, II et al. |
| 5,872,552 A | 2/1999 | Gordon, II et al. |
| 5,961,804 A | 10/1999 | Jacobson et al. |
| 6,144,361 A | 11/2000 | Gordon, II et al. |
| 6,172,798 B1 | 1/2001 | Albert et al. |
| 6,271,823 B1 | 8/2001 | Gordon, II et al. |
| 6,337,761 B1 | 1/2002 | Rogers et al. |
| 6,525,865 B2 | 2/2003 | Katase |
| 6,525,866 B1 | 2/2003 | Lin et al. |
| 6,529,313 B1 | 3/2003 | Lin et al. |
| 6,535,326 B2 | 3/2003 | Uno |
| 6,574,034 B1 | 6/2003 | Lin et al. |
| 6,636,341 B2 | 10/2003 | Kanbe |
| 6,639,580 B1 | 10/2003 | Kishi et al. |
| 6,650,462 B2 | 11/2003 | Katase |
| 6,650,463 B2 | 11/2003 | Obikawa et al. |
| 6,677,926 B2 | 1/2004 | Biegelsen |
| 6,680,726 B2 | 1/2004 | Gordon, II et al. |
| 6,693,621 B1 | 2/2004 | Hayakawa et al. |
| 6,710,540 B1 | 3/2004 | Albert et al. |
| 6,727,873 B2 | 4/2004 | Gordon, II et al. |
| 6,727,882 B1 | 4/2004 | Large et al. |
| 6,727,883 B2 | 4/2004 | Uno et al. |
| 6,738,039 B2 | 5/2004 | Goden |
| 6,741,385 B2 | 5/2004 | Ikeda et al. |
| 6,750,844 B2 | 6/2004 | Nakanishi |
| 6,751,007 B2 | 6/2004 | Liang et al. |
| 6,751,008 B2 | 6/2004 | Liang et al. |
| 6,762,744 B2 | 7/2004 | Katase |
| 6,781,745 B2 | 8/2004 | Chung et al. |
| 6,788,449 B2 | 9/2004 | Liang et al. |
| 6,795,229 B2 | 9/2004 | Liang et al. |
| 6,806,995 B2 | 10/2004 | Chung et al. |
| 6,816,146 B2 | 11/2004 | Harada et al. |
| 6,822,783 B2 | 11/2004 | Matsuda et al. |

(Continued)

*Primary Examiner*—Timothy J Thompson
(74) *Attorney, Agent, or Firm*—Ingrassia Fisher & Lorenz, P.C.

(57) ABSTRACT

In accordance with the invention, there are systems for electronic paper, apparatus for electrophoretic display, and methods of making an electrophoretic display. The system for electronic paper can comprise an electret substrate wherein the electret substrate comprises an inhomogeneous distribution of charges and a plurality of capsules disposed in the electret substrate, wherein each of the plurality of capsules comprises a first plurality of charged pigments having a first color and a first charge, wherein the first charge has a polarity opposite to that of the charges in the electret substrate, a fluid having a second color contrasting to the first color, and a housing configured to house the plurality of charged pigments and the fluid.

17 Claims, 4 Drawing Sheets

U.S. PATENT DOCUMENTS

| | | |
|---|---|---|
| 6,829,078 B2 | 12/2004 | Liang et al. |
| 6,831,770 B2 | 12/2004 | Liang et al. |
| 6,833,943 B2 | 12/2004 | Liang et al. |
| 6,850,355 B2 | 2/2005 | Liang et al. |
| 6,850,357 B2 | 2/2005 | Kaneko et al. |
| 6,859,302 B2 | 2/2005 | Liang et al. |
| 6,862,129 B2 | 3/2005 | Matsuda et al. |
| 6,865,012 B2 | 3/2005 | Liang et al. |
| 6,867,898 B2 | 3/2005 | Liang et al. |
| 6,873,451 B2 | 3/2005 | Ukigaya |
| 6,885,495 B2 | 4/2005 | Liang et al. |
| 6,897,996 B2 | 5/2005 | Ikeda et al. |
| 6,900,924 B2 | 5/2005 | Goden |
| 6,906,851 B2 | 6/2005 | Yuasa |
| 6,909,532 B2 | 6/2005 | Chung et al. |
| 6,922,275 B2 | 7/2005 | Ikeda |
| 7,307,779 B1 * | 12/2007 | Cernasov .................... 359/296 |
| 2002/0033792 A1 * | 3/2002 | Inoue ......................... 345/107 |

\* cited by examiner

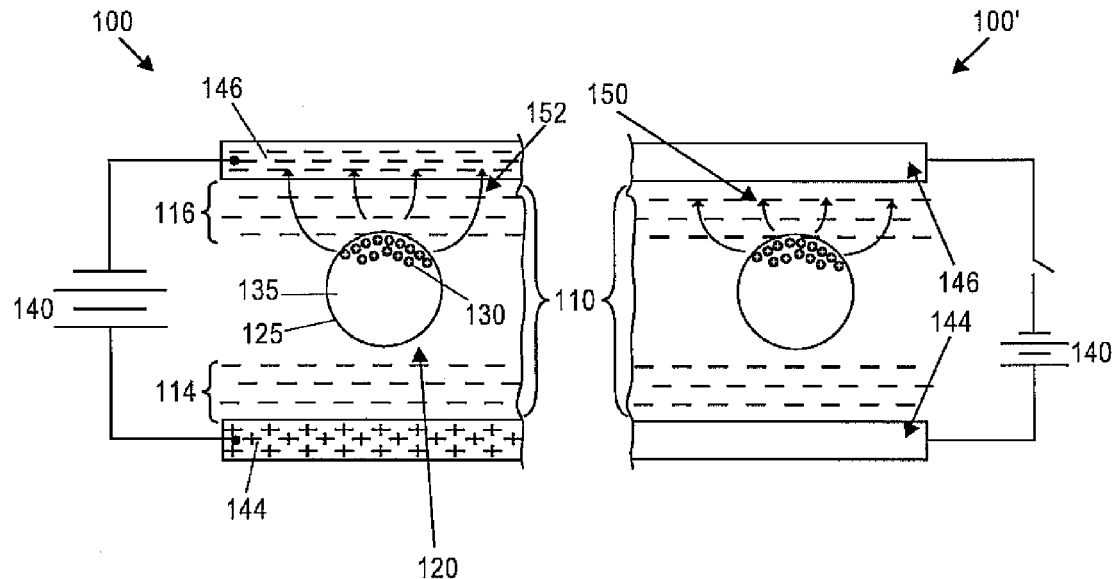
FIG. 1A  FIG. 1B
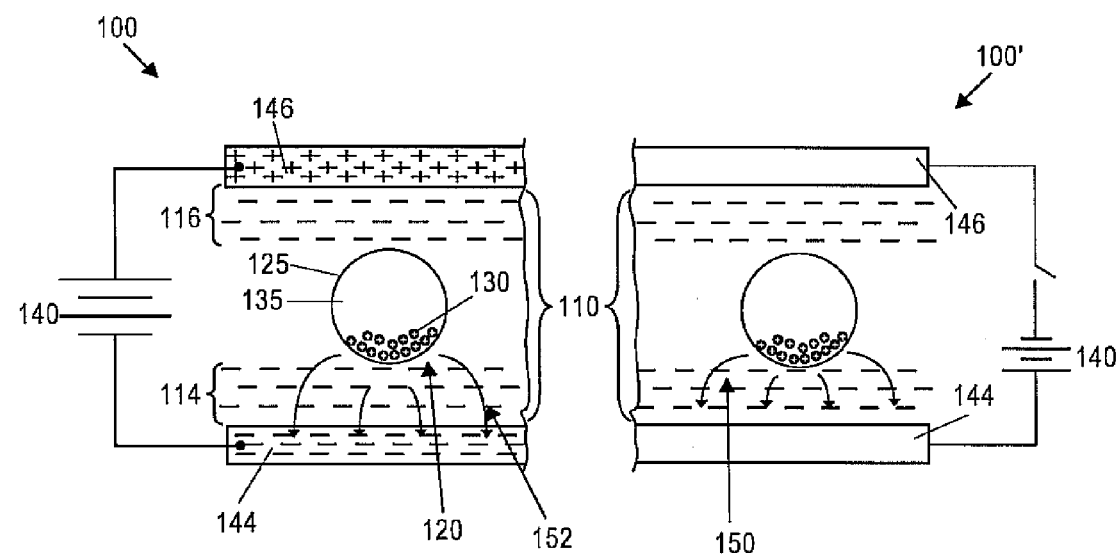
FIG. 1C  FIG. 1D

NON-VOLATILE ADDRESSABLE ELECTRONIC PAPER FOR DISPOSABLE FLEXIBLE DISPLAYS

FIELD OF THE INVENTION

The subject matter of this invention relates to display systems. More particularly, the subject matter of this invention relates to an apparatus and a system for electronic paper display.

BACKGROUND OF THE INVENTION

Electronic paper or e-paper displays address the need for inexpensive yet flexible devices for large area and disposable applications which are unsuitable for standard liquid crystal displays (LCD) and light emitting diode (LED) displays.

Flexible e-paper displays generally use one of the two types of particle displays: suspended particle display (SPD) and electrophoretic image display (EPID). In a SPD, the orientation of the particles is selectively controlled to produce the optical contrast required for a display. In an EPID, the distribution of particle population is selectively controlled in order to produce the optical contrast required for a display. In both cases an electric field is used to control the particles. It should be noted that particles in both display types are suspended in a liquid medium, and in one case the response to the electric field is with respect to orientation, and in the other with respect to distribution.

SPDs are attractive due to their wide viewing angle, high optical transmission and ease of fabrication. In a SPD, light valve action is obtained when sub-micron sized particles with an asymmetric, plate-like shape align with an externally-applied electric field, and thus permit light to pass through (the "light" state). This alignment occurs because the external field induces a dipole moment in the molecules of the particles. In the absence of the external field, the particles orient randomly due to Brownian motion, and consequently block light (the "dark" state). A significant disadvantage of SPDs is that the light areas of the display must be continuously energized with the external electric field to maintain the display, thus consuming energy even when the image on the display is static. SPDs also typically lack a clear voltage threshold (threshold), and require active-matrix addressing for high resolution.

In EPIDs, the particles used in the display are electrically charged and may have a color that contrasts with the liquid used to suspend them. The EPID generally operates by reflection and absorption as opposed to transmission. Although EPIDs have some inherent memory, this memory is due to the viscosity of the liquid medium and therefore decays with time. And because there is no voltage threshold, making multiplexed displays is difficult.

Current e-paper displays have two major problems; volatility (they require continuous power for stable display) and lack of threshold thus making multiplexing difficult. Current solutions for these problems, such as the use of TFT drives, limits the useful size of these displays and dramatically increase their costs. Hence, there is need to solve these and other problems of the prior art.

SUMMARY OF THE INVENTION

In accordance with the invention, there is a system for electronic paper. The system can include an electret substrate wherein the electret substrate includes an inhomogeneous distribution of charges and a plurality of capsules disposed in the electret substrate, wherein each of the plurality of capsules includes a first plurality of charged pigments having a first color and a first charge, wherein the first charge has a polarity opposite to that of the charges in the electret substrate, a fluid having a second color contrasting to the first color, and a housing configured to house the plurality of charged pigments and the fluid.

According to another embodiment, there is an apparatus for an electrophoretic display. The apparatus can include an electret substrate wherein the electret substrate comprises an inhomogeneous distribution of charges and a plurality of capsules disposed in the electret substrate, wherein each of the plurality of capsules comprises a first plurality of charged pigments having a first color and a first charge, wherein the first charge has a polarity opposite to that of the charges in the electret substrate, a fluid having a second color contrasting to the first color, and a housing configured to house the plurality of charged pigments and the fluid.

According to yet another embodiment, there is a method of making an electrophoretic display. The method can include providing an electret substrate including a plurality of charges, wherein a majority of the charges are substantially at a surface of the electret. The method can also include providing a plurality of capsules disposed in the electret substrate, wherein each of the plurality of capsules comprises a first plurality of charged pigments having a first color and a first charge, wherein the first charge has a polarity opposite to that of the charges in the electret substrate, a fluid having a second color contrasting to the first color, and a housing configured to house the plurality of charged pigments and the fluid. The method can further include providing a plurality of first electrodes interfaced with a first surface of the electret substrate, wherein the first electrodes are spatially separated from one another and providing a plurality of second electrodes interfaced with a second surface of the electret substrate wherein the second electrodes are spatially separated from one another. The method can also include providing a power supply that provides an external electric field between the first electrodes and the second electrodes.

Additional advantages of the embodiments will be set forth in part in the description which follows, and in part will be obvious from the description, or may be learned by practice of the invention. The advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

BRIEF DESCRIPTION OF THE DRAWINGS

FIGS. 1A to 1D schematically illustrate a portion of a pixel of a collection of pixels of exemplary systems for electronic paper.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

As used herein, the terms "electronic paper" and "e-paper" are used interchangeably with the terms electrophoretic display, displacement particle display, particle display, flexible display, and disposable display. The term "charged pigment" is used interchangeably with the terms pigments, particles, charged particles, and charged pigment particles.

Figure 2:
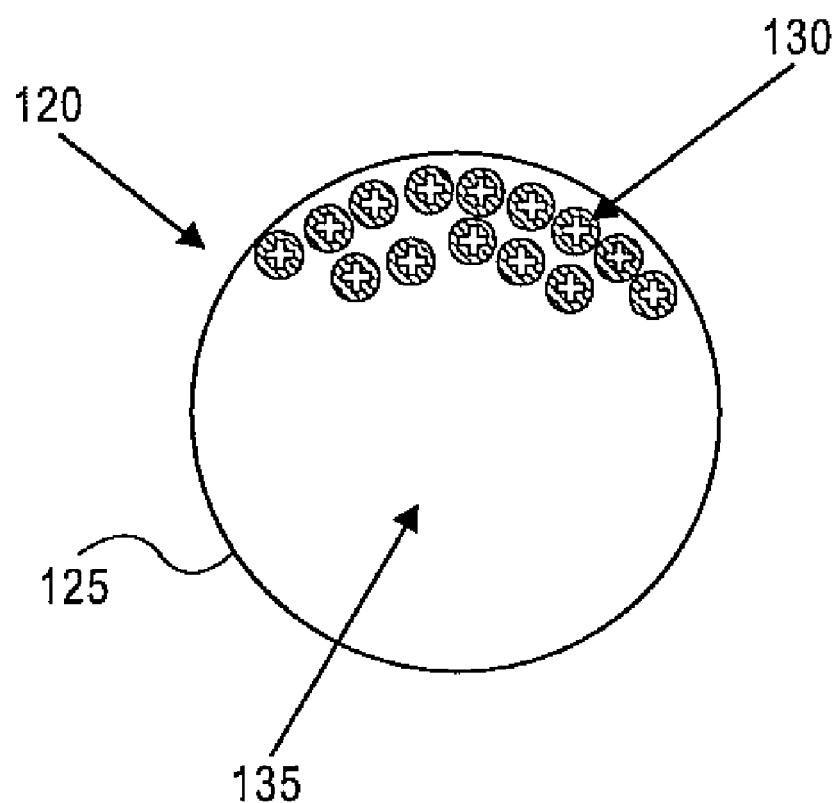
FIG. 2 illustrates an exemplary capsule for electronic paper.

A system for electronic paper includes an array of pixels. The term "pixel" is used interchangeably herein with terms including cell and unit cell. FIGS. 1A-1D schematically illustrate a portion of a pixel of a collection of pixels of exemplary systems 100 and 100' for electronic paper. The exemplary systems 100 and 100' for electronic paper can include an electret substrate 110 wherein the electret substrate 110 includes an inhomogeneous distribution of charges and a plurality of capsules 120 disposed in the electret substrate 110, wherein each of the plurality of capsules 120 includes a first plurality of charged pigments 130 having a first color and a first charge, wherein the first charge has a polarity opposite to that of the charges in the electret substrate 110, a fluid 135 having a second color contrasting to the first color, and a housing 125 configured to house the plurality of charged pigments 130 and the fluid, as illustrated in FIG. 2. In various embodiments, the inhomogeneous distribution of charges in the electret substrate 110 can include a majority of charges substantially at a surface 114, 116 of the electret substrate 110 as shown in FIGS. 1A-1D.

The exemplary systems 100 and 100' for electronic paper as shown in FIGS. 1A-1D can also include a plurality of first electrodes 144 interfaced with a first surface 114 of the electret substrate 110, wherein the first electrodes 144 are spatially separated from one another and a plurality of second electrodes 146 interfaced with a second surface 116 of the electret substrate 110, wherein the second electrodes 146 are spatially separated from one another. The term "interfaced" used herein means "in physical contact with". The exemplary systems 100 and 100' can further include a power supply 140 that can provide an external electric field between one or more of the first electrodes 144 and one or more of the second electrodes 146.

FIG. 1A depicts the exemplary system 100 in response to an external electric field between one or more of the first electrodes 144 and one or more of the second electrodes 146. When a voltage is applied between one or more of the first electrodes 144 and one or more of the second electrodes 146, one or more of the first electrodes 144 can develop a positive charge and one or more of the second electrodes 146 can develop a negative charge. As depicted in FIG. 1A, in response to the external electric field, the plurality of charged pigments 130 move in the direction of the second electrodes 146 having a negative polarity that is opposite to that of the charged pigments 130, due to a composite electric field 152. The composite electric field 152 is the sum of the external electric field between one or more of the first electrodes 144 and one or more of the second electrodes 146 and the local electric field 150 between the charged pigments 130 and the electret substrate 110. Upon removal of the external electric field between one or more of the first electrodes 144 and one or more of the second electrodes 146, the plurality of charged pigments 130 substantially remain in their position, as shown in FIG. 1B. The substantial ceasing of the movement of the charged pigments 130 is due to the local electric field 150 established between the charged pigments 130 and the majority of charges substantially at the surface 114, 116 of the electret substrate 110.

FIG. 1C depicts the exemplary system 100 in response to an external electric field between one or more of the first electrodes 144 and one or more of the second electrodes 146, that is opposite to the external electric field shown in FIG. 1A. Upon application of a voltage between one or more of the first electrodes 144 and one or more of the second electrodes 146, one or more of the first electrodes 144 can develop a negative charge and one or more of the second electrodes 146 can develop a positive charge. As depicted in FIG. 1C, in response to the external electric field, the plurality of charged pigments 130 move in the direction of the first electrodes 144 having a negative polarity that is opposite to that of the charged pigments 130. Upon removal of the external electric field between one or more of the first electrodes 144 and one or more of the second electrodes 146, the plurality of charged pigments 130 substantially remain in their position, as shown in FIG. 1D. The local electric field 150 between the charged pigments 130 and the majority of charges substantially at the surface 114, 116 of the electret substrate 110 peaks when the charged pigments 130 are either in the front or the back of the capsule 120, i.e. the charged pigments 130 are closer to either the first surface 114 or the second surface 146 of the electret substrate 110. This gives each of the plurality of the capsules its bistable character.

The electret substrate 110 can include one or more highly insulating clear polymer such as a fluoropolymer, a polypropylene, a polyethyleneterephthalate, etc., with an inhomogeneous distribution of charges. According to various embodiments, an inhomogeneous distribution of charges in an electret substrate 110 can be formed by exposing at least one or both sides of the electret substrate 110 to an intense source of electrons. The electrons from the intense source can penetrate the electret substrate 110 exponentially thereby giving an inhomogeneous distribution of charges to the electret substrate 110. In some embodiments, a majority of charges substantially at a surface of the electret substrate 110 can be formed by stacking multiple layers of electret substrate, with layers at both sides having a substantially greater amount of charge than those in the middle. According to various embodiments, the electret substrate 110 can have a total charge substantially the same but opposite in polarity to the total charge of the plurality of capsules 120. In other embodiments, the electret substrate 110 can have a thickness less than or equal to about 10 times the diameter of a capsule 120, and in some cases about 6 times the diameter of the capsule 120, and in some other cases about 4 times the diameter of the capsule 120.

Referring back to FIG. 2, the housing 125 of the capsule 120 can be implemented with a low permittivity dielectric material such as Teflon™, polyethylene, or other similar materials. In some embodiments, the housing 125 can be implemented as part of the electret substrate 110 that is not charged. More particularly, the capsule 120 can be embedded in the electret substrate 110. In certain embodiments, the capsules 120 can have a size with diameter ranging from about 20 μm to about 200 μm, and in some cases from about 50 μm to about 100 μm. In other embodiments the capsule 120 can be ellipsoidal in shape.

In various embodiments, the first electrodes 144 and the second electrodes 146 can include a multiplexing electrode array. In some embodiments, the first electrodes 144 and the second electrodes 146 can include a multiplexing electrode array. In some other embodiments, the first electrodes 144 and the second electrodes 146 can include a standard X-Y indium Tin Oxide ("ITO") array. The ITO array can be configured to provide control of the capsules 120 on a pixel basis. In some embodiments, a thin layer of aluminum or gold can be used as the first electrodes 144 and the second electrodes 146. In various embodiments, an electric field of up to 1 million Volt/meter can be developed between one or more of the first electrodes 144 and one or more of the second electrodes 146 by applying an exemplary voltage of about 50 V between one or more of the first electrodes 144 and one or more of the second electrodes 146, when the thickness of the electret substrate can be about 50 μm.

Figure 3:
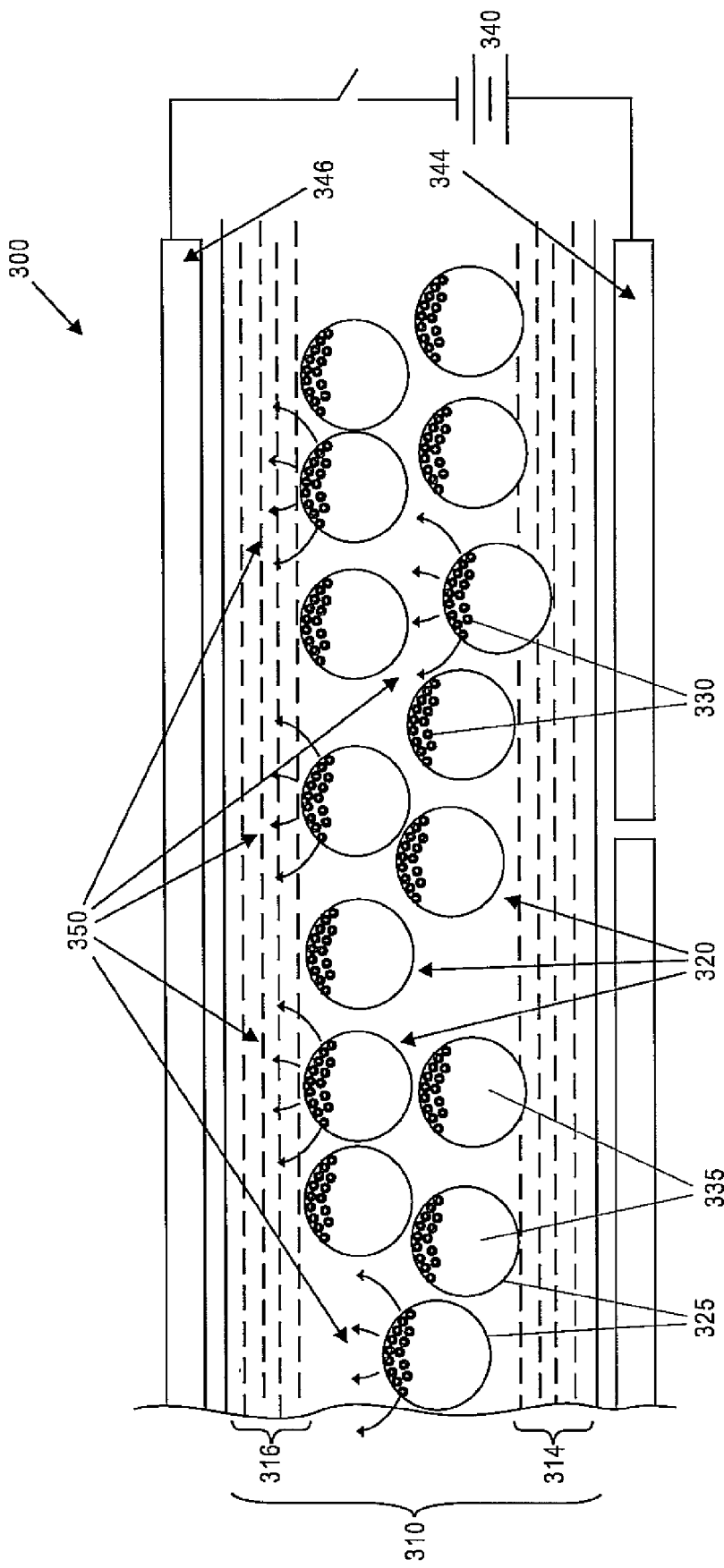
FIG. 3 is a schematic illustration of an exemplary apparatus for an electrophoretic display according to the present teachings.

According to various embodiments, an apparatus for an electrophoretic display 300 is illustrated in FIG. 3. The apparatus for an electrophoretic display 300 can include an electret substrate 310 including a majority of the charges substantially at a surface 314, 316 of the electret substrate 310. The electret substrate 310 can include a plurality of capsules 320, wherein each of the plurality of the capsules 320 can include a first plurality of charged pigments 330 having a first charge and a first color, wherein the first charge has a polarity opposite to that of the charges in the electret substrate 310, a fluid 335 having a second color contrasting to the first color and a housing 325 configured to house the plurality of charged pigments 320 and the fluid 335. The apparatus for an electrophoretic display 300 can also include a plurality of first electrodes 344 interfaced with a first surface 314 of the electret substrate 310, wherein the first electrodes 344 are spatially separated from one another and a plurality of second electrode 346 interfaced with a second surface 316 of the electret substrate 310, wherein the second electrodes 346 are spatially separated from one another. In various embodiments, the first electrodes 344 and the second electrodes 346 can include a multiplexing electrode array. In some embodiments, the first electrodes 344 and the second electrodes 346 can include a multiplexing electrode array. In some other embodiments, the first electrodes 344 and the second electrodes 346 can include a standard X-Y Indium Tin Oxide ("ITO") array. The apparatus for an electrophoretic display 300 can further include a power supply 340 that provides a voltage between one or more of the first electrodes 344 and one or more of the second electrodes 346. When a voltage is applied between one or more of the first electrodes 344 and one or more of the second electrodes 346, the plurality of charged pigments 330 move in response due to a composite electric field (not shown). The composite electric field is the sum of the external electric field between one or more of the first electrodes 344 and one or more of the second electrodes 346 and the local electric field 350 between the charged pigments 330 and the electret substrate 310. Upon removal of the applied voltage between one or more of the first electrodes 344 and one or more of the second electrodes 346, the plurality of charged pigments 330 remain substantially in their position in response to the local electric field 350 between the charged pigments 330 and the majority of charges substantially at a surface 314, 316 of the electret substrate 310.

Figures 4A, 4B:
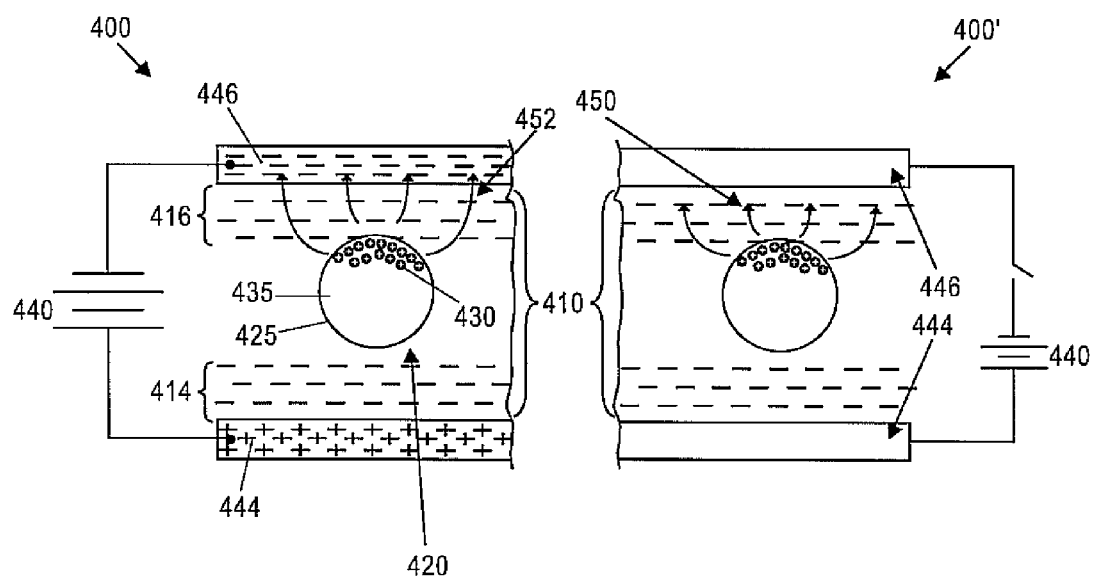
FIGS. 4A and 4B illustrate an exemplary method of making an electrophoretic display.

According to yet another embodiment, there is a method of making an electrophoretic display as shown in FIGS. 4A and 4B. The method can include providing an electret substrate 410 including a majority of charges substantially at a surface 414, 416 of the electret substrate 410, and providing a plurality of capsules 420 disposed in the electret substrate 410. Each of the plurality of the capsules 420 can include a first plurality of charged pigments 430 having a first color and a first charge, wherein the first charge has a polarity opposite to that of the charges in the electret substrate 410, a fluid 435 having a second color contrasting to the first color, and a housing 425 configured to house the plurality of charged pigments 420 and the fluid 435. The method can also include providing a plurality of first electrodes 444 interfaced with a first surface 414 of the electret substrate 410, wherein the first electrodes 444 are spatially separated from one another and providing a plurality of second electrodes 446 interfaced with a second surface 416 of the electret substrate 410, wherein the second electrodes 446 are spatially separated from one another. The method can further include providing a power supply 440 to supply voltage between one or more of the first electrodes 444 and one or more of the second electrodes 446. The method can also include applying the electric field between one or more of the first electrodes 444 and one or more of the second electrodes 446, as shown in FIG. 4A, such that the plurality of charged pigments 430 move towards the electrode having a polarity that is opposite to that of the charged pigments 430 in response due to a composite electric field 452, which is the sum of the external electric field between one or more of the first electrodes 444 and one or more of the second electrodes 446 and the local electric field 450 between the charged pigments 430 and the electret substrate 410. The method can further include removing the electric field between one or more of the first electrodes 444 and the second electrodes 446, thereby substantially ceasing the movement of the charged pigments 430, and wherein the plurality of charged pigments 430 remain substantially in their position, due to the local electric field 450 between the charged pigments 430 and the majority of charges substantially at a surface 414, 416 of the electret substrate 410, as shown in FIG. 4B.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for electronic paper, the system comprising:
    an electret substrate wherein the electret substrate comprises an inhomogeneous distribution of charges;
    a plurality of capsules disposed in the electret substrate, wherein each of the plurality of capsules comprises a first plurality of charged pigments having a first color and a first charge, wherein the first charge has a polarity opposite to that of the charges in the electret substrate, a fluid having a second color contrasting to the first color, and a housing configured to house the plurality of charged pigments and the fluid;

a plurality of first electrodes interfaced with a first surface of the electret substrate, wherein the first electrodes are spatially separated from one another; and a plurality of second electrodes interfaced with a second surface of the electret substrate wherein the second electrodes are spatially separated from one another.

2. The system of claim 1, wherein the inhomogeneous distribution of charges comprises a majority of charges substantially at a surface of the electret.

3. The system of claim 1, further comprising a power supply that provides an external electric field between one or more of the first electrodes and one or more of the second electrodes.

4. The system of claim 1, wherein the capsules have a diameter ranging from about 20 μm to about 200 μm.

5. The system of claim 2, wherein each of the first and second electrodes comprises a multiplexing electrode array.

6. The system of claim 1, wherein the electret substrate comprises one or more of a fluoropolymer, a polypropylene, and a polyethyleneterephthalate.

7. The system of claim 1, wherein the electret substrate has a total charge substantially the same but opposite in polarity to the total charge of the plurality of charged pigments.

8. The system of claim 1, wherein the electret substrate has a thickness less than or equal to about ten times the diameter of the capsule.

9. An apparatus for an electrophoretic display, the apparatus comprising:

an electret substrate wherein the electret substrate comprises an inhomogeneous distribution of charges; and a plurality of capsules disposed in the electret substrate, wherein each of the plurality of capsules comprises a first plurality of charged pigments having a first color and a first charge, wherein the first charge has a polarity opposite to that of the charges in the electret substrate, a fluid having a second color contrasting to the first color, and a housing configured to house the plurality of charged pigments and the fluid, wherein the electret substrate has a total charge substantially the same but opposite in polarity to the total charge of the plurality of charged pigments.

10. The apparatus of claim 9 further comprising:

a plurality of first electrodes interfaced with a first surface of the electret substrate, wherein the first electrodes are spatially separated from one another; and a plurality of second electrodes interfaced with a second surface of the electret substrate, wherein the second electrodes are spatially separated from one another.

11. The apparatus of claim 10 further comprising a power supply that provides an external electric field between the first electrodes and the second electrodes.

12. The apparatus of claim 9, wherein the capsules have a diameter ranging from about 20 μm to about 200 μm.

13. The apparatus of claim 9, wherein each of the first and second electrodes comprises a multiplexing electrode array.

14. The apparatus of claim 9, wherein the electret substrate comprises one or more of a fluoropolymer, a polypropylene, and a polyethyleneterephthalate.

15. The apparatus of claim 9, wherein the electret substrate has a thickness less than or equal to about ten times the diameter of the capsule.

16. A method of making an electrophoretic display, the method comprising:

providing an electret substrate comprising a plurality of charges, wherein a majority of the charges are substantially at a surface of the electret;

providing a plurality of capsules disposed in the electret substrate, wherein each of the plurality of capsules comprises a first plurality of charged pigments having a first color and a first charge, wherein the first charge has a polarity opposite to that of the charges in the electret substrate, a fluid having a second color contrasting to the first color, and a housing configured to house the plurality of charged pigments and the fluid;

providing a plurality of first electrodes interfaced with a first surface of the electret substrate, wherein the first electrodes are spatially separated from one another;

providing a plurality of second electrodes interfaced with a second surface of the electret substrate wherein the second electrodes are spatially separated from one another;

providing a power supply that provides an external electric field between the first electrodes and the second electrodes; and applying the electric field between one or more of the first electrodes and one or more of the second electrodes, such that the plurality of charged pigments move towards the electrodes having a polarity that is opposite to that of the charged pigments.

17. The method of claim 16, further comprising removing the electric field between one or more of the first electrodes and one or more of the second electrodes, thereby substantially ceasing the movement of the charged pigments, and wherein the plurality of charged pigments remain substantially in their position.

* * * * *